Aug. 11, 1959  F. J. WHITE  2,899,022
BRAKE OPERATING MEANS
Filed Feb. 24, 1956  2 Sheets-Sheet 1

INVENTOR
F. J. WHITE
BY A. Yates Dowell
ATTORNEY

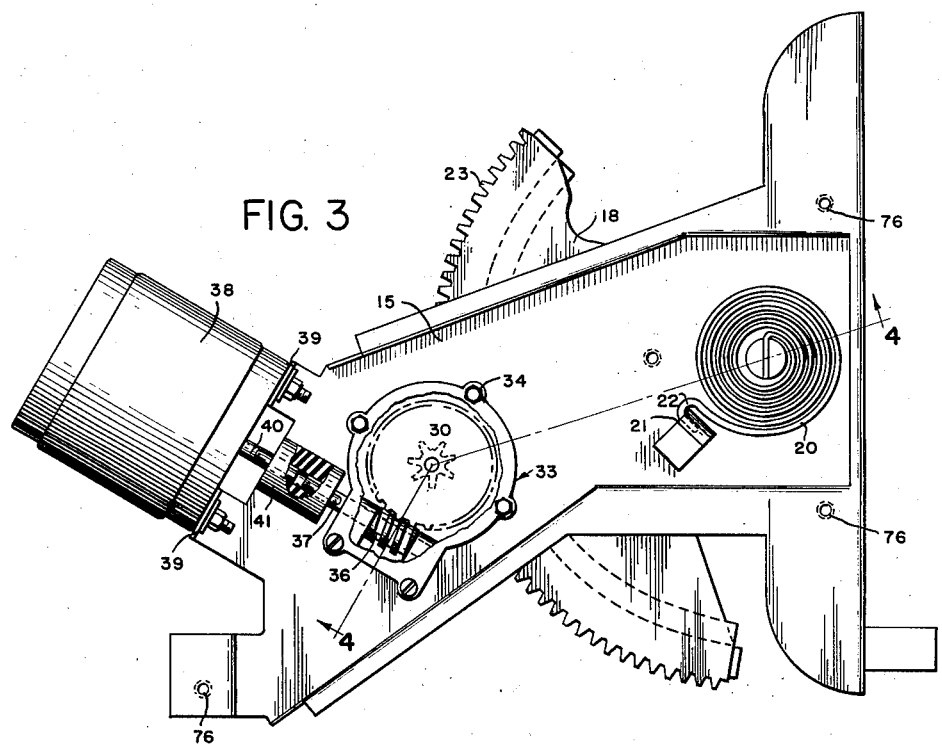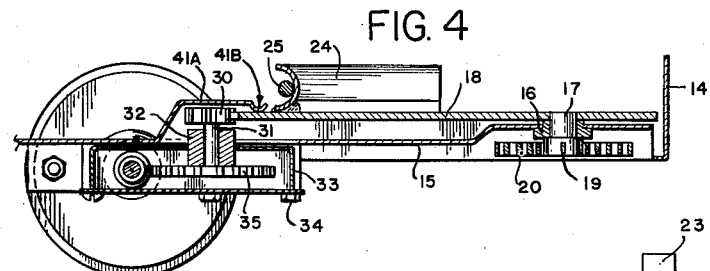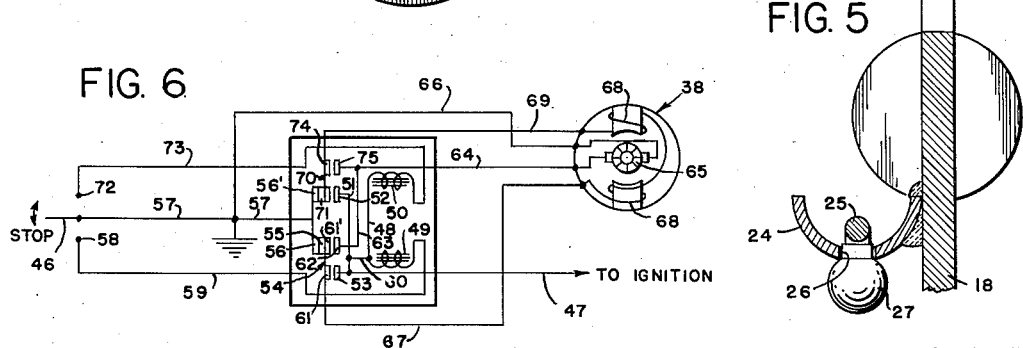

United States Patent Office 2,899,022
Patented Aug. 11, 1959

2,899,022

BRAKE OPERATING MEANS

Fred James White, Lakeland, Fla.

Application February 24, 1956, Serial No. 567,565

9 Claims. (Cl. 188—2)

The present invention relates to braking mechanism for vehicles and more particularly to an electrically powered parking brake which may be used on existing automobiles with a minimum of labor for the installation thereof.

Heretofore brake mechanisms of various types have been used in vehicles and some brakes have included power operating means including compressed air, electricity and the like but none of such power brakes has been entirely satisfactory for use on competitive models of automobiles because of the excessive cost and also the uncertainty of continuous operation for the life of the vehicle.

An object of the present invention is to provide a brake operating mechanism which can be controlled by a simple switch within easy reach of the operator of the vehicle for both applying and releasing the brakes.

Another object of the invention is to provide an attachment which may be readily applied to existing vehicles in a minimum of time to change the hand-operated parking brake into a power-operated brake.

A further object is to provide a parking brake with a switch operated as soon as the brake is moved from its inoperative position for energizing a stop light when the ignition is on.

Figure 1:
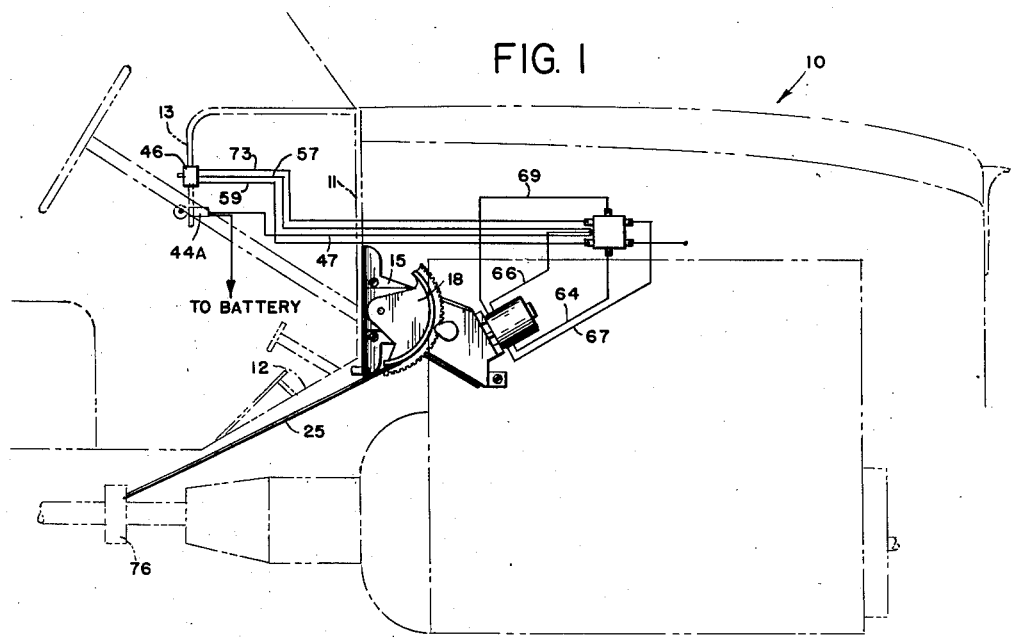
Figure 2:
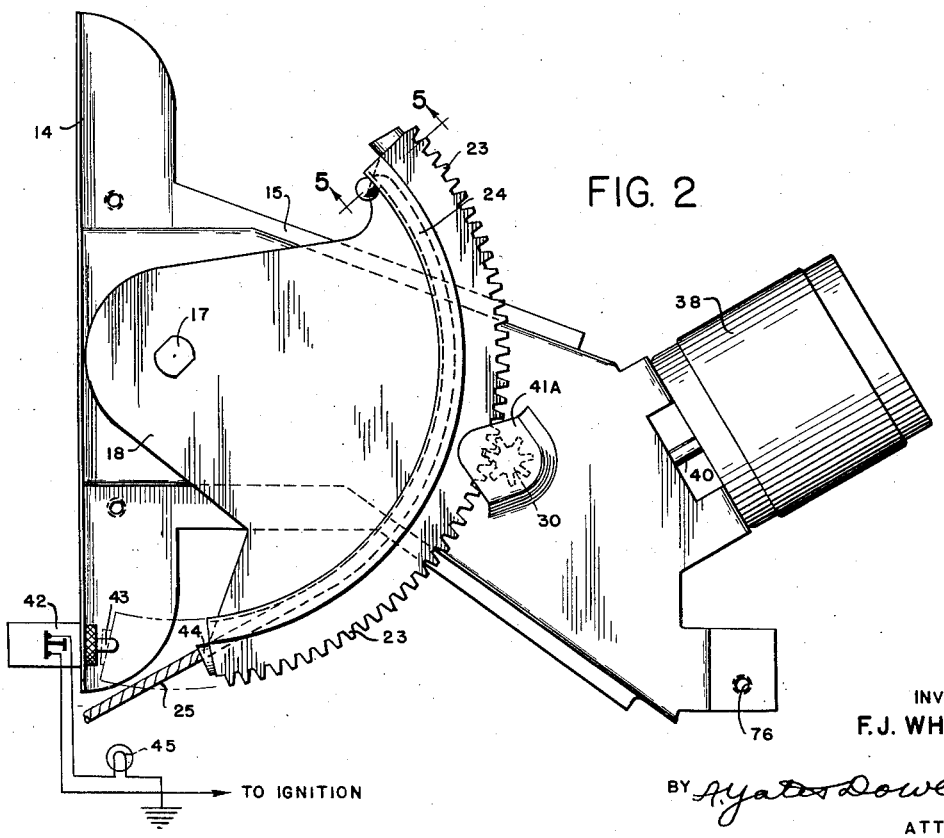

Other and further objects will be apparent as the description proceeds and upon reference to the accompanying drawing wherein:

Fig. 1 is a right side elevation of the brake operating mechanism mounted for operation on an automobile fragmentarily shown in phantom lines;

Fig. 2, a side elevation of the brake operating attachment on an enlarged scale as seen from the right side of a vehicle;

Fig. 3, a similar enlarged view as seen from the left side of a vehicle;

Fig. 4, a section taken substantially on broken line 4—4 of Fig. 3 and illustrating the gear operated structure;

Fig. 5, an enlarged fragmentary section taken substantially on line 5—5 of Fig. 2; and Fig. 6, a diagrammatic illustration of the wiring connections and the relays for controlling the motor for producing brake applying and brake releasing action.

Briefly stated, the present invention relates to a brake operating structure in the form of an attachment applied to a vehicle, said attachment including a base adapted to be fixed on a vehicle, a gear segment rotatably mounted on a base, an electric motor means and gear reduction units for operating said gear segment in brake applying and brake releasing directions. The gear segment is provided with an arcuate shaped cable receiving trough to one end of which a brake operating cable is secured, the adjacent portions of the cable lying in the trough and the other end of such cable being attached to the brake operating lever or other brake structure. An electric motor controlled by an easily accessible switch on the dashboard provides operating means for applying and releasing the brakes.

Referring more particularly to the drawing, a vehicle 10 shown in phantom lines as including the usual fire wall 11, sloping floor board 12, and an instrument panel 13 of conventional construction has a brake operating electrically powered attachment mounted on the fire wall 11. The attachment includes a base plate 14 from which an outwardly extending column 15 projects forwardly, such column being provided with a bearing 16 secured therethrough adjacent the base and rotatably carrying a shouldered shaft 17 having a reduced end fixedly secured to a segmental gear 18 so that such segmental gear may oscillate about the axis of shaft 17, the opposite end of the shaft 18 being enlarged and having a slot in which a tongue 19 of a spiral spring 20 is received, the other end of the spiral spring 20 being secured on a lug 21 by means of the hooked end 22 of the spiral spring.

The segmental gear 18 has secured adjacent its teeth 23 and spaced radially inwardly therefrom a cable receiving trough 24 of arcuate configuration with the trough shown as being substantially concentric with the gear teeth 23. The cable 25 is secured to the upper end of the trough 24 by having the end of the cable 25 pass through an aperture 26. An enlargement such as a ball 27 is swaged or otherwise secured to the cable end, such ball being of a size greater than the aperture 26 to prevent the cable from being pulled out of the aperture.

A spur gear 30 is fixedly mounted on a shaft 31 which is rotatably mounted in a bearing 32 in a gear housing 33 which gear housing is secured by suitable means such as bolts 34 to the column 15. A worm gear 35 is also fixed to the shaft 31 and meshes with a worm 36 fixed to a shaft 37 rotatably mounted in thrust bearings in the gear housing 33. The shaft 37 is driven by a motor 38 removably secured to bent-over lugs 39 on the column 15 by means of bolts and the shaft 40 of the motor is coupled by means of a tubular rubber-like driving coupling 41 to the shaft 37 so that operation of the motor in one direction causes the gear segment 18 to move in one direction while operation of the motor 38 in the opposite direction results in movement of the segmental gear in the opposite direction. A guard 41A struck out of the material in the column covers the gear 30 and also has an extension 41B engageable with segmental gear 18 to maintain the gear teeth 23 thereof in mesh with the teeth of spur gear 30.

As it is often desirable to indicate to other motorists that an automobile is about to stop, a normally closed switch 42 is mounted on the base 14 and has a projecting plunger rod 43 in the path of a lug 44 on the lower end of the gear segment 18 which lug contacts with rod 43 pressing such rod to the left as seen in Figs. 1 and 2 thereby opening switch 42 so that a stop light 45 in the circuit of switch 42 supplied with current from the ignition switch will remain extinguished as long as the lug 44 contacts and depresses the rod 43, such a situation occurring when the brake is released and the gear segment is in its extreme position shown in dotted lines. When the gear segment is moved upwardly when the brake is applied the plunger rod 43 projects out closing the switch 42 thereby illuminating the stop light as long as the ignition switch 44A of the automobile is turned "on."

The electrical motor 38 is normally inoperative but is under the control of the normally open single pole double throw switch 46 on the dash 13, which switch is connected to the motor through a relay and supplied with electric power from the "cold" side of the ignition switch through a lead 47 as shown in the wiring diagram in Fig. 6. Said lead 47 is connected through leads 51 and 60 to a lead 48 common to a relay coil 49 and a relay coil 50, the lead 47 also being connected by the lead 51 extending to fixed contacts 52 and 53. The armature 54 associated with relay coil 49 has one contact 55 normally in engagement with a fixed contact 56 of the pair of electrically connected fixed contacts 56, 56' which in turn are connected by a lead 57 to ground by leads 57 to the switch leaf of the normally open single pole double throw switch 46. When it is desired to operate the brake the switch leaf 46 is pushed downwardly to close with a contact 58 connected by a lead 59 to relay coil 49 the circuit extending from relay coil 49 through lead 60 to lead 51 to lead 47 and to the ignition switch which supplies electricity from a battery or other source of supply when the ignition switch is turned to the "on" position thereby energizing coil 49 the circuit being completed from the other side of coil 49 through lead 59 to contact 58 through switch leaf 46 and lead 57 to ground. The armature 54 associated with relay coil 49 consequently is drawn toward the coil carrying the electrically connected dual contact 61, 61' against contacts 53 and 62 thereby supplying current from lead 47 through the relay armature 54 to lead 63 to a lead 64 connected to the rotor 65 of the motor 38 and from the rotor 65 a lead 66 passes back to lead 57 and to ground, the relay armature 54 having been drawn to separate contacts 56 and 55 thereby avoiding a short circuit. During this time, current is supplied from the relay contact 61 which is in engagement with contact 53 through lead 67 connected to the field windings 68 of the motor 38 and from the field windings 68 the circuit is completed through lead 69 to a relay armature 70 associated with de-energized relay coil 50 and through contact 71 and contact 56' which are closed as shown in the diagram, to lead 57 to ground, whereby rotation of the armature 65 of motor 38 results in upward or counterclockwise movement of the gear segment 18 as seen in Figs. 1 and 2 thereby tensioning the cable 25 and applying the brakes.

When it is desired to release the brakes, the switch handle 46 is raised completing a circuit from ground through lead 57 to switch 46 through contact 72 lead 73 to the relay coil 50 and from the relay coil through leads 48, 60 and 51 to lead 47 connected to the ignition switch thereby energizing relay coil 50 and causing the relay armature 70 to be drawn so that contact 71 thereof separates from contact 56' and makes a circuit to contact 52 which is connected through leads 51 to lead 47 from the "cold" side of the ignition switch, the other contact 74 of the energized relay armature 70 making contact with contact 75 which is connected by lead 64 to rotor 65 of motor 38 and from the rotor 65 through lead 66 back to lead 57 and to ground. Simultaneously therewith the closure of relay armature contact 71 with contact 52 results in the supply of electrical energy from lead 47, lead 51, contacts 52 and 71, relay armature 70 and lead 69 to the field coils 68 and then through field coils 68 through lead 67 to contacts 61 and 55 of relay armature to contact 56 to lead 57 to ground so that the field of motor 38 is reversed with respect to the rotor 65 thereby producing reverse rotation resulting in release of the brake 76 to which the cable 25 is connected and the gear sector 18 is moved to its lower inoperative position shown in dotted lines in Fig. 2 so that the plunger rod 43 of normally closed switch 42 is depressed thereby opening the switch 42 and extinguishing the stop light 45.

From the above description it is believed that the operation and installation of the brake operating mechanism should be clear. The base 14 may be secured to the fire wall of the automobile or the column may be secured to the side frame member or the fender baffle of the automobile chassis. Suitable openings 76 on the column 15 may be internally threaded for receiving bolts or the like for attachment to suitable brackets or support means on the automobile. Also suitable openings may be provided in the base 14 for attachment to a fire wall or any suitable bracket means and the base and column may both be secured to the automobile frame structure in any suitable manner. The attachment may also be located in other parts of the vehicle including positions under the floor boards is desired since only wiring connections would have to be changed.

It will be evident that the brake mechanism can only be operated when the ignition switch 44A is turned to its "on" position. This will be of great value, particularly where there are small children playing in automobiles since there is no possibility of the children releasing the brake when the ignition key is turned to its "off" position. This also should reduce the danger of theft of a vehicle equipped with the brake operating mechanism of the present invention.

Although the cable 25 is shown as being conventional which may pass directly to the brake operating lever, the cable 25 may be housed within a flexible housing so that the cable 25 and its flexible housing may pass around various structural parts of the automobile thereby simplifying the installation, such flexible cable housing is preferably secured by suitable clamp means or the like to the base 14 for taking the reaction.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. A brake operating structure for attachment to the fire wall of an automobile adjacent the intersection of the sloping floor boards with such fire wall, said attachment including a base for direct attachment to the fire wall and an outwardly extending support projecting forwardly therefrom, a segmental gear rotatably mounted on a horizontal axis closely adjacent said base, said gear carrying an arcuate shaped cable receiving trough adjacent its periphery, a spur gear in engagement with said segmental gear for operating the same, said spur gear being mounted on a shaft, a worm gear mounted on said shaft, means to mount said shaft on said support, a worm gear housing surrounding said worm gear, a worm rotatably mounted in said housing and meshing with said worm gear, a motor for connection to said worm gear and including a universal coupling for operating said worm even though the motor shaft is not in perfect alignment with said worm shaft, a normally closed switch supplied with current from the ignition switch of the vehicle and being connected to the brake lamp of the said vehicle for causing energization of said brake lamp when the brake is effective and means on said gear segment for contacting said normally closed switch for opening said switch when the brake operating gear segment is in the limit of its brake releasing position, and an electrical control for operating the motor for causing said motor to rotate in one direction to apply the brake or to cause the motor to rotate in the other direction to release the brake.

2. A brake operating structure for attachment to the fire wall of an automobile adjacent the intersection of the sloping floor boards with such fire wall, said attachment including a base for direct attachment to the fire wall and an outwardly extending support projecting forwardly therefrom, a segmental gear rotatably mounted on a horizontal axis closely adjacent said base, said gear carrying an arcuate shaped cable receiving trough adjacent its periphery, a spur gear in engagement with said segmental gear for operating the same, said spur gear being mounted on a shaft, a worm gear mounted on said shaft, means to rotatably mount said shaft on said support, a worm gear housing surrounding said worm gear, a worm rotatably mounted in said housing and meshing with said gear, a motor for connection to said worm gear and including a universal coupling for operating said worm even though the motor shaft is not in perfect alignment with said worm shaft, a normally closed switch supplied with current from the closed ignition switch of the vehicle and being connected to the brake lamp of the said vehicle for causing energization of said brake lamp when the brake is effective and means on said gear segment for contacting said normally closed switch for opening said switch when the brake operating gear segment is in the limit of its brake releasing position, and an electrical control for operating the motor for causing said motor to rotate in one direction to apply the brake or to cause the motor to rotate in the other direction to release the brake, said base being arranged transversely to the plane of said cable engaging trough so that tension on a cable in said trough will be applied to said base within the confines thereof thereby avoiding a displacing stress, said base being arranged so that a cable extending tangent to said cable receiving trough may pass directly beneath the floor boards without requiring intermediate guiding whereby a direct pull is exerted on the brake applying cable.

3. A brake operating mechanism for attachment to an automobile comprising a support, a segment rotatably mounted on said support, an arcuate shaped cable receiving trough adjacent the periphery of said segment, a motor for operating said segment, a normally closed switch supplied with current from the ignition switch of the vehicle and being connected to the brake lamp of the said vehicle for causing energization of said brake lamp when the brake is out of its ineffective position and means on said segment for contacting said normally closed switch for opening said switch when the brake operating segment is in the limit of its inoperative position, and an electrical control for operating the motor for causing said motor to rotate in one direction to apply the brake or to cause the motor to rotate in the other direction to release the brake.

4. The combination with a vehicle comprising a supporting element mounted on the vehicle and extending outwardly from a structural member of the vehicle, an arcuate segment pivotally mounted on said supporting member, a cable receiving trough on said arcuate segment, means to operate said arcuate segment in response to manual control means, and a cable secured to said segment adjacent one end of said trough, said cable extending from said arcuate segment to the brake operating mechanism of a vehicle whereby the operator of a vehicle may apply or release the brakes with a minimum of effort or delay.

5. A brake operating mechanism for attachment to a vehicle comprising a supporting element, an operating element pivotally mounted on said supporting member, a cable receiving trough on said operating element, means to operate said element in response to manual control means, and a cable secured to said element adjacent one end of said trough, said cable extending from said element to the brake operating mechanism of a vehicle whereby the operator of a vehicle may apply or release the brakes with a minimum of effort or delay.

6. A power operating mechanism for applying a pre-determined force to a mechanical element such as a brake, said power applying means comprising a base, a segmental gear rotatably mounted on said base with the axis closely adjacent the base, a curved trough shaped channel fixed with respect to said gear segment, means to secure a cable to one end of said curved trough, said cable being attachable to an operating element such as a brake for applying a pre-determined force thereto, an electric motor, drive means from said electric motor to said gear segment, said drive means being non-reversible whereby the segment can not be moved in either direction without operation of said motor, and switch means for selectively operating said motor in a forward or a reverse direction for applying and releasing the force on said cable.

7. The invention according to claim 6 in which a normally closed switch is arranged in a series circuit with an indicator, co-acting means between said gear segment and said switch for opening said switch when said gear segment is at the limit of movement releasing the force on said cable, said indicator being effective at all other times to indicate any change of said gear segment from its limit of movement releasing the force on said cable.

8. In combination with a vehicle having a substantially vertical fire wall with inclined floor boards extending downwardly at an angle from the lower end of the fire wall, a base pivotally mounted on the fire wall adjacent the bottom edge thereof, an arcuate segment pivotally mounted on said base closely adjacent said fire wall and floor boards with the periphery of said arcuate segment extending below the fire wall and the floor boards, an arcuate trough fixed to said arcuate segment adjacent the periphery thereof for receiving a brake operating cable therein, a cable secured to the upper end of said arcuate trough and extending in the trough and to a vehicle brake, an arcuate gear segment projecting outward radially beyond said trough and fixed to said arcuate segment, a support extending from said base, a shaft rotatably mounted in said support, a spur gear on said shaft meshing with said arcuate gear segment, a worm gear fixed on said shaft, a motor mounted on said support, a worm meshing with said worm gear and operatively connected to said motor for rotating said arcuate segment in both directions, said gearing and motor being of the type which prevents rotation of said gear segment unless said motor is energized whereby the brake can be set in all positions.

9. The invention according to claim 8 in which a signal lamp is provided and a normally closed switch is mounted on said base in the path of said arcuate segment for controlling the signal lamp extinguishing such signal lamp only when said arcuate segment is moved to the limit of its brake releasing movement whereby said signal lamp will be energized at all other times.

References Cited in the file of this patent

UNITED STATES PATENTS

| | | |
|---|---|---|
| 1,271,163 | Hartford | July 2, 1918 |
| 1,513,586 | Davis | Oct. 28, 1924 |
| 1,529,326 | Sullivan | Mar. 10, 1925 |
| 2,251,521 | McIntyre et al. | Aug. 5, 1941 |
| 2,256,371 | Cerveny | Sept. 16, 1941 |
| 2,513,275 | Bartsch | July 4, 1950 |
| 2,572,742 | Miller | Oct. 23, 1951 |